United States Patent [19]

Buccicone

[11] 3,782,529
[45] Jan. 1, 1974

[54] MAGNETIC RAIL CONVEYOR
[75] Inventor: Dario Buccicone, Gary, Ind.
[73] Assignee: Bucciconi Engineering Co., Inc., Gary, Ind.
[22] Filed: July 12, 1972
[21] Appl. No.: 270,963

[52] U.S. Cl. .............................. 198/41, 271/63 A
[51] Int. Cl. ............................................ B65g 17/46
[58] Field of Search ...................... 198/41; 271/63 A

[56] References Cited
UNITED STATES PATENTS
3,150,764  9/1964  Buccicone .......................... 198/41

Primary Examiner—Edward A. Sroka
Attorney—Guy A. Greenawalt

[57] ABSTRACT

An overhead rail-type metal sheet conveyor which comprises an elongate frame with a pair of endless sheet carrying belts carried on spaced end pulleys and a plurality of spaced electromagnets mounted in a downwardly opening housing having therein adjustable plate-like elements with downwardly opening guide recesses in which the belts travel while the sheets are held thereon by magnetic force and advanced along the lower run of the conveyor.

4 Claims, 7 Drawing Figures

PATENTED JAN 1 1974

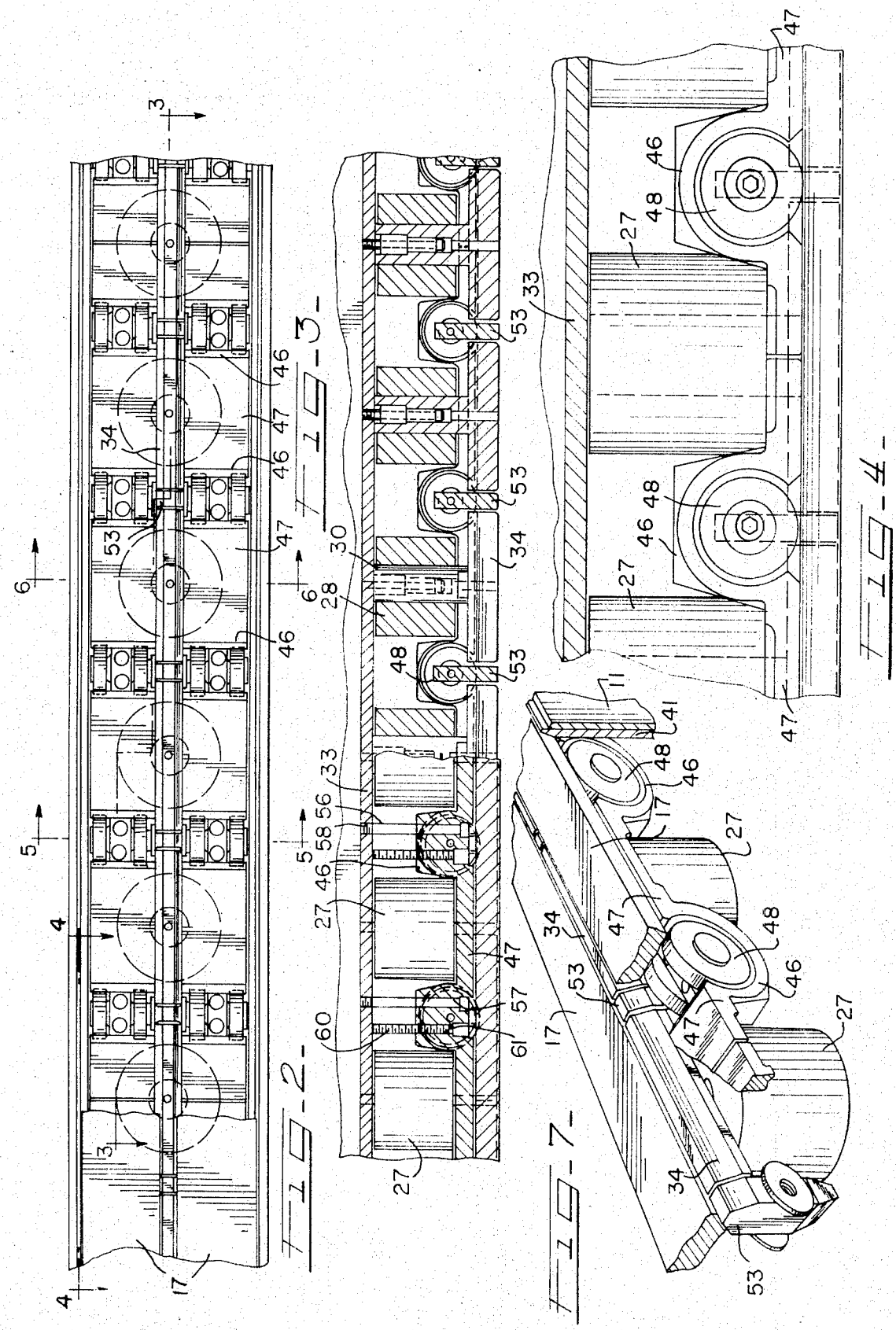

MAGNETIC RAIL CONVEYOR

This invention relates to article conveyors and is more particularly concerned with improvements in an overhead conveyor of the type which employs magnetic force for holding magnetizable metal sheets or similar products against the bottom surface of one or more traveling belts.

Conveyors for handling metal sheets and similar products have heretofore been developed which rely on magnetic force for holding the sheets or similar products against the bottom surface of one or more traveling belts. Conveyors of this type which are in the form of elongate rails are shown, for example, in U.S. Pats. No. 2,374,174, dated Apr. 24, 1945; U.S. Pat. No. 2,600,475, dated June 17, 1952; U.S. Pat. No. 2,642,174, dated June 16, 1953; and U.S. Pat. No. 3,150,764, dated Sept. 29, 1964. In these prior arrangements pairs of relatively narrow belts have been employed which are substantially less in width than the width of the bottom of the conveyor frame. The belts have been arranged for travel in guide recesses or guideways opening on the bottom face of a supporting frame so that substantial portions of the belt guiding and supporting members are exposed between the belts and at the side edges thereof. This has made it desirable to provide for relatively accurate adjustment of the guiding and supporting means for the belts so as to prevent drag on the sheets due to excessive contact with exposed surfaces of the belt supporting and guiding members which could cause undesirable marring or damage to the sheets. In this type of conveyor in the past individual supporting and guiding members have been associated with each of the electromagnets, the latter being supported in longitudinally spaced relation in a housing extending along the length of the conveyor frame, with the result that difficulty has been encountered in keeping the belt guides in proper alignment and in maintaining the electromagnets in properly adjusted position. It is a general object of the present invention to provide a multiple belt magnetic rail-type conveyor in which relatively narrow belts are employed and arranged so that a substantially continuous flat surface is provided for engaging the sheet, with improved supporting arrangements for the belts which facilitate adjustment of the belt guide members, control of the belt path and repair and replacement of parts as well as simplification of manufacturing requirements.

It is a more specific object of the invention to provide a sheet conveyor of the magnetic rail type in which electromagnets are arranged in longitudinally spaced relation along a supporting frame with associated belt supporting members which extend along a plurality of the magnets and which are capable of fine adjustment so as to provide an accurate path and achieve maximum efficiency in guiding the belts.

It is another object of the invention to provide a magnetic rail-type conveyor in which a plurality of magnets are arranged in longitudinally spaced relation with associated belt guiding plate members and a means for holding the guide members in proper position and for filling the space between the cores of the magnets so as to maintain the cores in proper position for efficient magnetic attraction.

It is still another object of the invention to provide an overhead magnetic rail-type belt conveyor wherein improved belt guiding plates are provided which are more readily manufactured and which are mounted so as to improve the operation of the belts in holding thereon and advancing the articles being conveyed.

It is a further object of the invention to provide a conveyor of the magnetic rail type having downwardly facing magnets spaced along bottom belt guiding elements with pole pieces having their lower ends tapered so as to form edge guides for a pair of closely spaced article carrying belts and with means for spacing the cores and for restraining the cores against turning movement so as to obtain maximum efficiency in operation.

These and other objects and advantages of the invention will be apparent from a consideration of the magnetic conveyor which is shown by way of illustration in the accompanying drawings wherein:

FIG. 2 is a partial bottom plan view of the conveyor, the view being taken on the line 2—2 of FIG. 1;

FIG. 3 is a longitudinal vertical section taken on the line 3—3 of FIG. 2;

FIG. 4 is a fragmentary longitudinal section taken on the line 4—4 of FIG. 2;

FIG. 7 is a fragmentary perspective view showing a portion of a belt guide member and portions of associated members.

Figure 1:
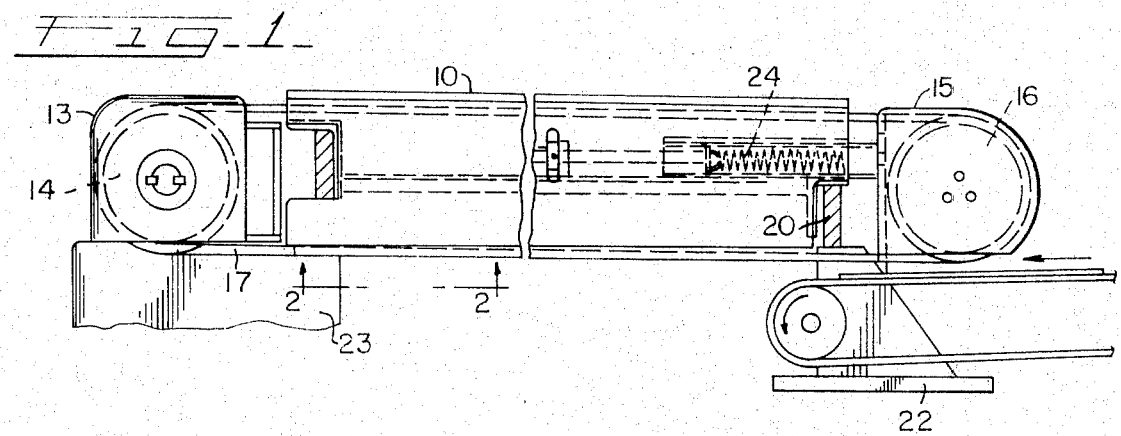
FIG. 1 is a side elevational view with portions broken away of a magnetic rail conveyor having incorporated therein the principal features of the present invention.

Referring first to FIGS. 1, 2, 3 and 5, there is illustrated a magnetic rail conveyor unit or assembly which comprises a supporting frame 10 formed by elongate, parallel, laterally spaced, vertically disposed side plates 11 and 12 having connecting members. A housing 13 is fixed at one end of the frame plates 11 and 12 which carries a belt supporting power driven pulley or sheave 14. A pair of housings 15 are adjustably mounted on the other end of the plates which carry belt supporting idler sheaves 16 so as to permit adjustment of the tension in the sheet carrying belts 17. A channel-shaped magnet housing 18 is secured in downwardly opening relation between the lower margins of the side plates 11 and 12, by welding or other fastening means. The magnet housing 18 maintains the side plates 11 and 12 in spaced apart relation and co-operates therewith in forming the supporting frame 10.

The conveyor unit, as illustrated, is supported on cross beams 20 and 21 which are in turn supported on end stands or end frames 22 and 23. Only on conveyor unit or rail assembly is shown in FIG. 1 but it will be apparent that several such units may be supported in side-by-side relation on the same cross beams 20 and 21. The number of rail units required will depend on the width of the sheets or other articles to be handled.

The pulley housings 13 and 15 are of conventional construction, such as shown in U.S. Pat. No. 3,150,764 and a belt tensioning arrangement, indicated at 24 in FIG. 1, is provided, which may be incorporated in the connection between the housing 15 and the support frame 10 as shown in U.S. Pat. No. 3,150,764.

Figure 6:
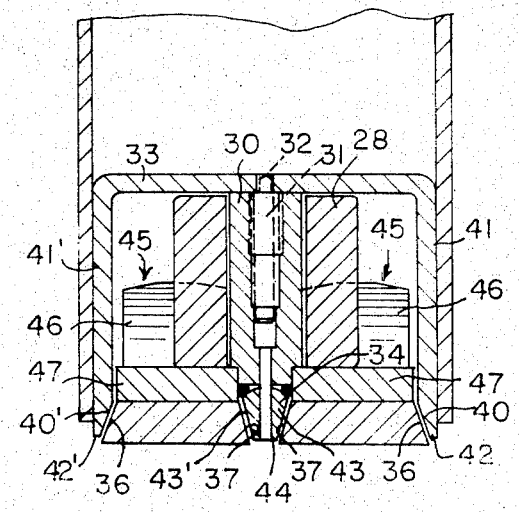
FIG. 6 is a fragmentary sectional view taken on the line 6—6 of FIG. 2.

The magnet housing 18 is channel shaped and is arranged at the bottom margins of the side plates 11 and 12 so that it is in downwardly opening or downwardly facing position with its open face extending along the bottom of the conveyor unit. A top cover plate 25 connects the top edges of the frame plates 11 and 12. A series of electromagnetic assemblies 27 are arranged in longitudinal alignment and secured within the housing 18. Each of these assemblies 27 comprises a coil 28 and a core 30 (FIG. 6). Each of these assemblies 27 is secured in the housing 18 by a stud bolt 31 which extends through a core 30 and engages in a threaded hole 32 in a web portion 33 of the housing forming the base or web portion 33 of the housing forming member 18. The assemblies 27 are spaced in the longitudinal direction of the conveyor and each core 30 is provided on its lower end with an elongate bar forming a longitudinal end extension 34 so that the core 30 and its end extension 34 have the form of an inverted T. Each end extension 34 is aligned with the corresponding core extension 34 on the adjoining assembly 27 so as to provide constant magnetic attraction along the length of the frame 10.

Figure 5:
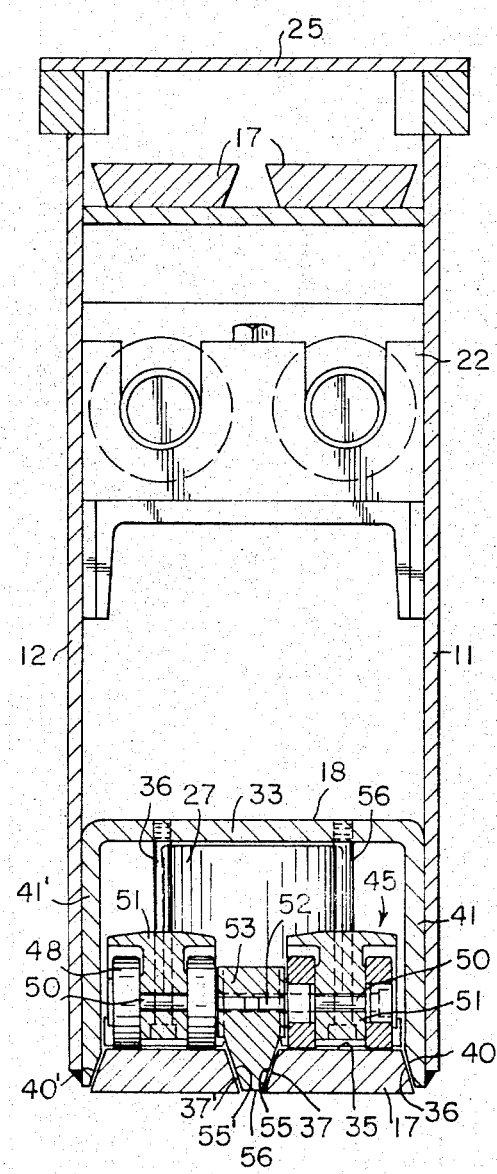
FIG. 5 is a cross sectional view taken on the line 5—5 of FIG. 2.

The belts 17 are relatively narrow and of truncated cone cross section and each belt has an inner face 35, which, along the lower run thereof, as shown in FIG. 5, faces upwardly in the housing 18. The side edges 36 and 37 of each belt are tapered inwardly in the direction of the inner face 35. The outside edges 36 of the belts 17 are guided by the inwardly tapered edges 40 and 40' on the inside margins of the side flanges 41, 41' of the magnet housing 18. The tapered surfaces or edges 40 and 40' extend from relatively narrow bottom edges 42, 42' on the side flanges 41, 41'. The taper on the belt edges corresponds to the taper on the guide surfaces 40 and 40'. The inside edges 37 of the belts 17 are guided by the tapered side faces 43 and 43' which are provided on the longitudinally disposed end extensions 34 of the cores 30 and which extend upwardly from a relatively narrow bottom edge surface 44.

The inside faces 35 of the belts 17 are guided and supported by roller and bracket assemblies 45 which are mounted to extend along the inside margins of the side flanges 41, 41' of the magnet housing 18. The assemblies 45 extend along a plurality of the magnets 27 with roller mounting bracket portions 46 and connecting plate elements 47. The roller and bracket portions or housings are spaced so that they are accommodated between the magnet coils 28. Each section 46 accommodates a pair of belt supporting rollers 48 which are mounted on a small cross shaft 50 journaled in a portion 51 of the housing 46. The roller housings 46 are aligned on opposite sides of the assemblies and the roller supporting shafts 50 have their inner ends extended into a cross bore 52 in a spacer member 53 which is of non-magnetic material and which serves to hold the assemblies 45 in properly spaced relation and which also serves to fill the space between the core extensions 34. The side faces of the spacer members 53 are tapered at 54 and 54' in the same manner as the tapered faces 43, 43' on the core extensions 34 with which they align. The tapered surfaces 54 and 54' extend upwardly of a relatively narrow bottom surface 55.

The belt guiding assemblies 45 are supported from the top wall 33 of the housing 18 by attaching bolts 56 (FIG. 3) which extend vertically through a bore 57 in the roller housing 46 and have threaded upper end engagement in threaded holes 58 provided in the housing plate or web member 33. An adjusting bolt 60 is provided adjacent each hanger bolt 56 which has a threaded shank engaged in a threaded bore 61 in the roller housing 46 with its free end abutting against the inside or lowermost face of the housing plate or web member 33 so that the two bolts 56 and 60 may be manipulated to vary the elevation of the rollers 48 and thus adjust the vertical position of the belts 17 which the rollers support.

In the use of the apparatus the belts 17 are disposed with their bottom faces on the lower run slightly below the surfaces 42, 42', 44 and 56 and the belts have a combined bottom face width which is only slightly less than the width measured between the outside edges of the narrow bottom surfaces 42, 42' on the housing flanges 41, 41'.

I claim:

1. In a magnetic rail conveyor unit having a mounting frame with means thereon for supporting on spaced end pulleys a pair of parallel traveling belts, a downwardly opening, channel-shaped housing extending along the bottom of the mounting frame, with the side walls having their inside bottom edge portions shaped to provide a surface conforming generally to the side edge configuration of the belts so as to form side edge guides for the outermost edges of said traveling belts along the lower run thereof, relatively long belt guiding and supporting members secured in laterally spaced relation in the bottom side of said housing and along said housing side walls, said belt guiding and supporting members having downwardly facing surfaces for engagement by the uppermost flat faces of the belts, spaced belt supporting roller assemblies mounted on said belt guiding and supporting members, and a series of electromagnets supported between said roller assemblies and in longitudinally spaced relation in said housing, each of said electromagnets having a pole piece of inverted T shape with a stem portion positioned vertically within the coil, said pole piece having a bottom extension which is positioned longitudinally between said belt guide members and which projects below the same, said bottom extension being shaped to provide a relatively narrow, elongate, bottom face and side edge faces shaped to provide surfaces conforming generally to the side edge configuration of the belts and forming guides for the adjacent inner side edges of said belts, said belts having their side edges disposed along the inside edges of the housing side walls and the side edge faces of the bottom extensions of said pole pieces, said belts having their bottom surfaces in a common plane and having their adjacent inner edges separated by only a small distance so that said belts have a combined width only slightly less than the distance between the exterior bottom edges of said housing side walls, said pole piece bottom bar portions being disposed in longitudinal alignment and non-magnetic spacer means disposed between adjacent ends of said pole piece bottom extensions which are mounted on said belt guiding and supporting members.

2. In a magnetic conveyor unit as set forth in claim 1 wherein said belt guiding and supporting members extend along a plurality of said electromagnets on opposite sides thereof and wherein said belt guiding and supporting members are mounted for adjustment in a vertical direction, and adjustable suspending means for said belt guiding and supporting members disposed between each of said electromagnets and operable to adjust the plane of operation of said belts relative to the exposed bottom faces of the extensions on said pole pieces and said housing.

3. In a magnetic conveyor unit as set forth in claim 1 wherein said belt supporting roller assemblies include roller housings spaced between said electromagnets with shaft means for mounting therein small belt supporting rollers and wherein said roller shaft means form a connection with said spacer means.

4. In a magnetic conveyor unit as set forth in claim 3 wherein said spacer means each comprise a member in the form of a relatively small block with oppositely disposed side faces having transversely aligned bores and wherein said roller shafts have end extensions received in said bores.

* * * * *